(No Model.)

F. E. GORE.
SPOOL HOLDER.

No. 431,347. Patented July 1, 1890.

WITNESSES:
Otto H. Ehlers.
John E. Morris.

INVENTOR:
F. E. Gore

BY Chas B. Mann
ATTORNEY.

THE NORRIS PETERS CO., PHOTO-LITHO., WASHINGTON, D. C.

UNITED STATES PATENT OFFICE.

FANNIE E. GORE, OF BALTIMORE, MARYLAND.

SPOOL-HOLDER.

SPECIFICATION forming part of Letters Patent No. 431,347, dated July 1, 1890.

Application filed December 27, 1889. Serial No. 335,150. (No model.)

*To all whom it may concern:*

Be it known that I, FANNIE E. GORE, a citizen of the United States, residing at Baltimore, in the State of Maryland, have invented certain new and useful Improvements in Spool-Holders, of which the following is a specification.

This invention relates to a spool-holder for holding a spool of thread and attaching it to the dress in a convenient manner for dressmakers and others.

The features of construction and the combination of parts whereby the desired result is accomplished will be described in connection with the accompanying drawings, in which—

Figure 1:
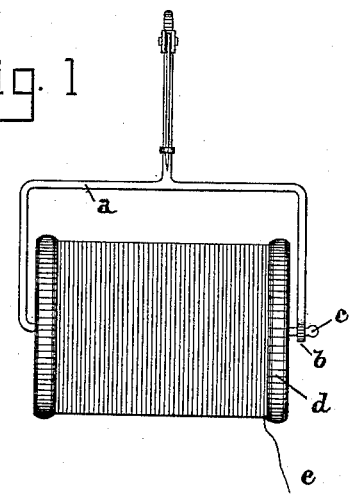
Figure 2:
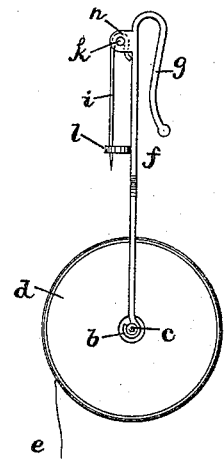
Figure 3:
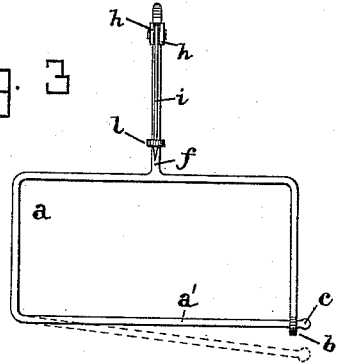

Figure 1 is a front view of the improved holder with a spool in position. Fig. 2 is an end view of the same. Fig. 3 is a view separately of the holder, showing by broken lines the disengagement of the part whereon the spool turns.

The spool-holder consists of a wire frame $a$, rectangular in shape and having provision at one of the lower corners to be opened and closed. This provision consists of a hook $b$ on the free end of one of the vertical sides of the frame and a small knob $c$ on the free end of the lower horizontal side $a'$ of the frame, so that this end can rest in the said hook $b$, as shown, and by the small knob be retained from endwise displacement. Any hook, bend, or other device which is the equivalent of the small knob may be used. The spool $d$ rests on the lower horizontal side $a'$ and turns thereon freely to unwind when the thread $e$ is pulled.

To place the spool on the holder, the side $a'$ is sprung loose from the hook $b$ and takes the position shown by dotted lines in Fig. 3. This side may then be entered into the hole of the spool, and the end which projects beyond the spool is engaged with the small hook $b$, as shown.

To this spool-holder frame I attach both an open hook and a pivoted or jointed pin for the purpose of securing and suspending the holder to the dress of a person. An upwardly-projecting wire $f$ is attached to the upper horizontal side of the frame, at the center thereof, and is curved and formed into a hook $g$ to readily hook into a button-hole of a coat or dress. This upwardly-projecting wire also has two lugs $h$ on its side opposite that where the hook $g$ is. A pin $i$ is jointed to these ears by a pivot $k$, and the point end or free end of the pin is held in place, when secured to the dress, by a keeper $l$, also attached to the wire $f$. Thus the pivoted pin $i$ projects directly opposite the hook $g$. I may therefore pin the holder-frame to the dress or coat by placing one of its broad sides toward the person, or I may hook it to the dress or coat by turning its opposite broad side toward the person. Thus the position of the hook and pin at opposite sides of the wire $f$ enables either to be readily used without interference one with the other.

Having described my invention, I claim—

A spool-holder consisting of a rectangular frame open at one corner, each end of the open portion being provided with a retainer for preventing accidental displacement of the two ends when joined together, and an upwardly-projecting wire $f$, secured to the upper side of the frame, the upper end of which is provided with an open hook $g$ on one side and two lugs or ears $h$ and a keeper $l$ on the side of the wire $f$ opposite the open hook, and a pin $i$, pivotally secured at one end between the lugs and having its opposite end adapted to engage with the keeper, the pivoted end of said pin bearing against the wire $f$ to prevent its free end from accidental displacement, substantially as described.

In testimony whereof I affix my signature in the presence of two witnesses.

FANNIE E. GORE.

Witnesses:
JOHN E. MORRIS,
JNO. T. MADDOX.